Patented Aug. 19, 1947

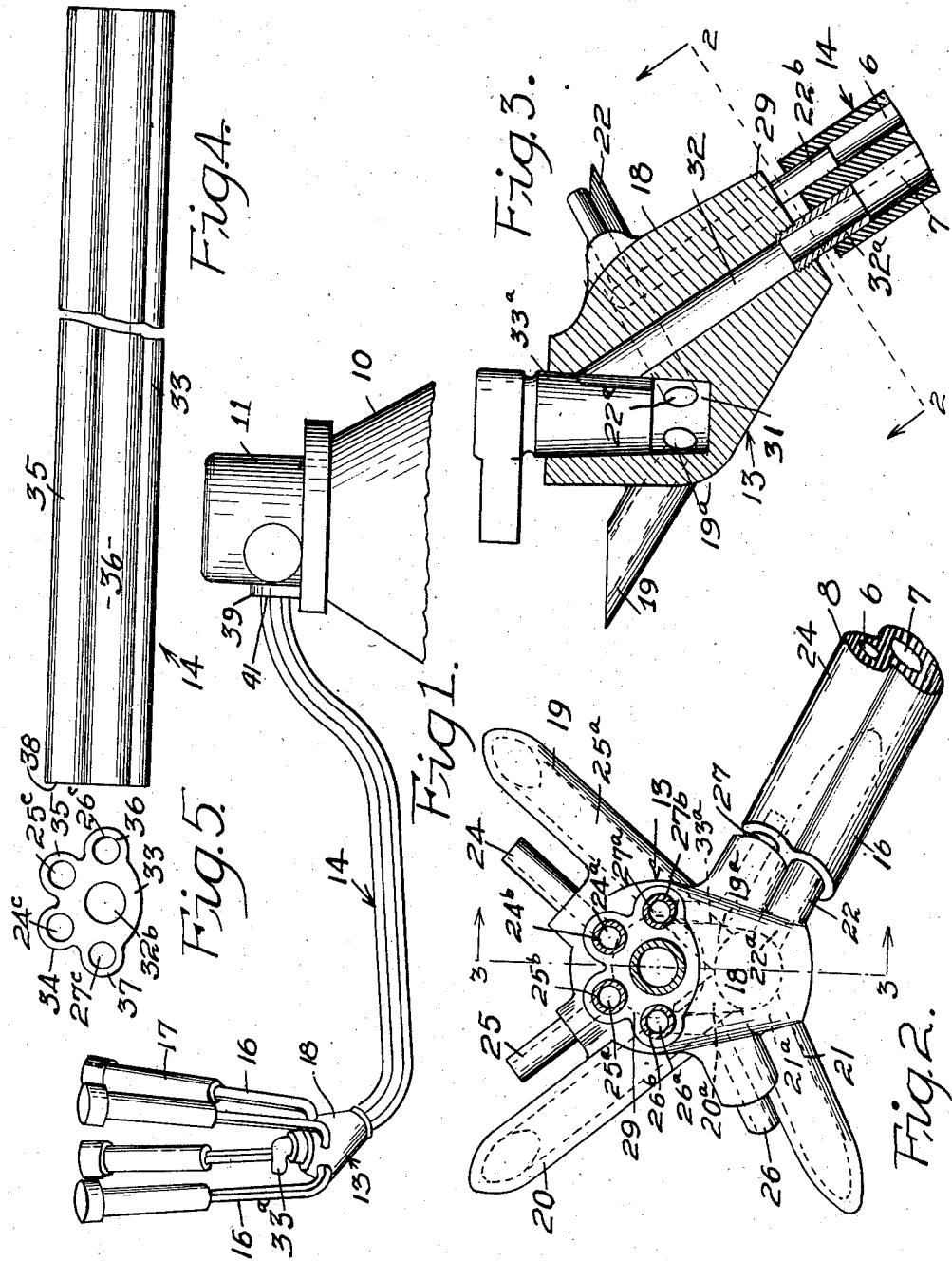

2,425,873

UNITED STATES PATENT OFFICE 2,425,873

CLAW ASSEMBLY FOR MILKING MACHINES

Frederick A. Gessler, Des Moines, Iowa, assignor, by mesne assignments, to Globe Milker, Inc., Des Moines, Iowa, a corporation of Illinois Application March 12, 1945, Serial No. 582,224

3 Claims. (Cl. 31—83)

This invention relates generally to milking machines and in particular to a claw assembly for a mechanical milking machine of the pulsator type.

Mechanical milking machines of the pulsator type generally include a claw member, teat cups and a suction apparatus usually comprising a pulsator and a milk receptacle maintained at a subatmospheric pressure. The claw member is ordinarily connected with the teat cups and the suction apparatus through ramified tube connections. Thus in some instances the claw member is connected with each teat cup through separate air and milk tubes, and with the suction apparatus through a common milk line and a plurality of air tubes. As a result the milking machine is a maze of tubes, difficult to handle in carrying either the complete machine or only the claw member with the tubes attached, and with the complexity of the tubes providing physical obstacles to persons working about or with the machine. Further the connections of the various milk and air tubes with the claw member and suction apparatus are oftentimes accomplished through fittings requiring appreciable time and manipulation in their assembly.

It is an object of this invention, therefore, to provide an improved claw assembly for a milking machine.

Another object of this invention is to provide an integrally constructed conduit member for connecting the claw member with the suction apparatus of a milking machine.

Yet another object of this invention is to provide a single conduit connected with the claw member and with the suction apparatus without the use of fittings or the like.

A feature of this invention is found in the provision of a milker claw assembly in which the claw member is provided with passages having portions projected in a relatively spaced relation from one of its sides. A conduit for connecting the claw member with a suction apparatus is integrally constructed with longitudinal passages arranged in a spaced relation corresponding to the spaced relation of the claw member projections, and has one end adapted to have such projections received therein in a plug and socket connection.

Further objects, features and advantages of this invention will become apparent from the following description when taken in connection with the accompanying drawings in which:

Fig. 1 shows the claw member assembly of this invention in assembly relation with the suction apparatus of a milking machine;

Fig. 2 is a sectional view of the claw member as seen along the line 2—2 in Fig. 3, with an air and milk tube forming part of a teat cup being shown connected therewith;

Fig. 3 is a sectional view of the claw member taken on the line 3—3 in Fig. 2;

Fig. 4 is a side elevational view of a combined air and milk conduit for connecting the claw member with the suction apparatus; and Fig. 5 is an end elevational view of the air and milk conduit looking toward the right in Fig. 4.

With reference to Fig. 1 of the drawings there is illustrated a mechanical milking machine of the pulsator type having a milk receptacle 10, normally retained under a sub-atmospheric pressure, and a head unit 11 mounted on the receptacle 10. The head unit includes a pulsator and an operating motor therefor (not shown), with the pulsator and the milk receptacle being referred to herein as the suction apparatus. The claw assembly of this invention includes a claw member 13 connected through a conduit 14 with the suction apparatus and through combined air and milk tubes 16 with teat cups 17.

As best appears in Figs. 2 and 3 the claw member is integrally constructed with a body member 18 of a generally irregular shape having a plurality of projected milk inlets 19, 20, 21 and 22 relatively spaced about 90° apart and extended upwardly and outwardly from the body member 18 as viewed in Figs. 2 and 3. Adjacent each of the milk inlets 19–22 are corresponding air passage extensions comprised of projected tubular members 24, 25, 26 and 27, respectively, suitably secured to the body member 18. An associated pair of tubular members and milk inlets is connected with a teat cup 17 through a tube 16 by inserting the tubular member and milk inlet within a corresponding air passage 6 and milk passage 7 at the free end 8 of the tube 16, as shown in Fig. 2, for the tubular member 27 and milk inlet 22.

The air tubes 24–27, inclusive, are connected with one end of air passages $24a$–$27a$, respectively, formed in the body member 18 of the claw 13. The opposite ends of the passages $24a$–$27a$, terminate in a flat side 29 of the claw body member 18. The milk inlets 19–22 are connected with one end of milk passages $19a$–$22a$, respectively, the opposite ends of which open into a common milk receiver or cavity 31 also formed in the body member 18. The milk receiver 31 is open to one end of a milk passage 32, the opposite end of which terminates in the flat side 29 of the body member 18. The flow of milk from the milk passages 19a-22a, and in turn the sub-atmospheric pressure in the receptacle 10, is controlled by a valve member 33 rotatable within the cavity 31 and of a construction adapted to open and close the common milk passage 32 from fluid communication with the cavity 31.

The air passages 24a-27a, inclusive, are extended outwardly from the side face 29 of the body member 18 by the provision of tube members 24b-27b, respectively, (Figs. 2 and 3). The milk passage 32 is similarly extended outwardly from the side face 29 by a tube member 32a which is of a larger diameter than the air tubes 24b-27b. All of the tubes 24b-27b, inclusive, and the tube 32a are extended from the claw 13 in a direction substantially normal to the side face 29. As best appears in Fig. 2 the milk tube 32a is located substantially centrally of the face 29 with the air tubes 24b-27b, being arranged in an angularly spaced relation within a circle concentric with the tube 32a for a purpose which will appear later. Thus all of the tubes, though relatively spaced from each other, are compactly grouped on the side face 29.

The conduit 14, for connecting the claw 13 with the suction apparatus, is composed of a flexible material such as rubber or the like having a body member 33 of an irregular shape in cross section and formed with a longitudinal milk passage 32b (Figs. 4 and 5). Integrally constructed with the body member 33 are a plurality of angularly spaced longitudinally extended radial projections 34, 35, 36 and 37 which are formed with longitudinal air passages 24c-27c, inclusive, respectively. The passages 32b and 24c-27c, extend the full length of the conduit 14 and are arranged in a spaced relation corresponding to the spaced relation of the milk tube 32a and the air tubes 24b-27b on the side face 29 of the claw member 13.

The assembly of the conduit 14 with the claw 13 is simply accomplished by inserting the tubes 32a and 24b-27b, inclusive, within the corresponding passages 32b and 24c-27c, respectively, at the end 38 of the conduit 14, with the passages 32b and 24c-27c, being of a size to snugly receive their associated tube members to provide a fluid tight engagement or seal of the conduit 14 with the claw member 13. It is thus seen that the tubes 32a and 24b-27b, inclusive, in conjunction with the flat side face 29 constitute a plug, while the end 38 of the conduit 14 with the passage openings therein serves as a socket for receiving the plug. The conduit 14 is thus connected with the claw member 13 in a plug and socket connection.

By virtue of the milk tube 32a being of a larger diameter than the air tubes 24b-27b, and with the milk passage 32b in the conduit 14 being of a larger diameter than the conduit air passages 24c-27c, the conduit 14 is always properly assembled with the claw member 13 to fluid connect the tubes 24b-27b, and 32a with their corresponding passages in the conduit 14. It is seen, therefore, that a connection of the conduit 14 with the claw member is positively and correctly accomplished without the use of any fittings requiring manipulation, and in a minimum of time by merely forcing the end 38 of the conduit 14 over its associated plug on the claw member. In the event the passages at the conduit end 38 become worn so as to fit too loosely over the tubes 32a and 24b-27b, it is only necessary to cut off an amount of the conduit sufficient to remove the worn portion. This may be continued until the conduit 14 is no longer serviceable.

The head unit 11 is provided with a plug, indicated generally as 39, adapted to be connected with the conduit end 41 in all ways similar to the connection of the conduit end 38 with the claw member 13 whereby the milk passage 32b is in fluid communication with the receptacle 10, and the air passages 24c-27c are connected with the pulsator. A further description of such connection is, therefore, believed to be unnecessary.

From a consideration of the above description it is seen that the invention provides a claw member assembly which is comprised of a minimum number of independent tube connections between the claw member and a suction apparatus of a milking machine, and between the claw member and the teat cups, so that the over-all machine is neat and compact in appearance and free of any tubes which may become easily entangled. Further the reduction of the tube connections appreciably reduces the hazard to the milking machine operator of tripping over any of the tube connections, either when they are in operating positions, or when they are moved with the machine from one cow to another. It is also seen that the conduit 14 is easily and quickly assembled with the claw member 13 by a simple but efficient plug and socket connection. The inconvenience of manipulating fittings, or keeping track of such fittings so that they do not become lost, is thus entirely eliminated. The difference in the relative size of the tube member 32a, and tube members 24b-27b in the plug on the claw member, the relative wide spacing between the tubes 26b and 27b, and the arrangement of the passages in the conduit 14 corresponding to such tube members, provide for the conduit 14 being always properly connected with the claw 13 whereby to positively preclude any wrong connecting of the air and milk passages.

Although the invention has been described with respect to a preferred embodiment thereof it is to be understood that it is not to be so limited since changes and modifications can be made therein which are within the full intended scope of this invention as defined by the appended claims.

I claim:

1. In combination, a milker claw having a projected milk outlet and a plurality of air passage extensions relatively spaced about said milk outlet and an integral conduit member having a milk passage and air passages therein open to one end of said conduit and arranged at said one conduit end in a spaced relation corresponding to the spaced relation of said milk outlet and air passage extensions, with said one end of the conduit providing socket openings in a common plane in the end face thereof for receiving said milk outlet and air passage extensions therein.

2. In combination, a milker claw member having a plurality of passages therein connected with a plurality of relatively spaced tube members projected from a side thereof, and an integral conduit member having a plurality of passages therein corresponding to said plurality of tube members and terminating in the end face at one end of said conduit member in a relatively spaced arrangement corresponding to the spaced relation of said tube members whereby to receive said tube members therein.

3. In combination, a milker claw member having a plurality of passages therein terminating in relatively spaced positions in a common face in one side thereof, an integral conduit member having a plurality of passages therein corresponding to the passages in said claw member and terminating in a face at one end of said conduit member in a relatively spaced arrangement corresponding to the spaced arrangement of the passages in said one side of the claw member, and tubular extensions connected with the passages in one of said members and receivable within the passages in the other of said members.

FREDERICK A. GESSLER.

REFERENCES CITED

The following references are of record in the file of this patent:

FOREIGN PATENTS

| Number | Country | Date |
|---|---|---|
| 330,182 | Italy | Oct. 7, 1935 |
| 3251/26 | Australia | Aug. 12, 1926 |